F. X. GANTER.
SHOW CASE.
APPLICATION FILED JUNE 23, 1910.

1,024,324.

Patented Apr. 23, 1912.

Witnesses:
Thos. F. Knox,
C. C. Hines,

Inventor:
Francis X. Ganter,
By Victor J. Evans,
Attorney.

COLUMBIA PLANOGRAPH CO., WASHINGTON, D. C.

UNITED STATES PATENT OFFICE.

FRANCIS X. GANTER, OF BALTIMORE, MARYLAND.

SHOW-CASE.

1,024,324.　　　　Specification of Letters Patent.　　Patented Apr. 23, 1912.

Application filed June 23, 1910. Serial No. 568,499.

*To all whom it may concern:*

Be it known that I, FRANCIS X. GANTER, a citizen of the United States, residing at Baltimore city, in the State of Maryland, have invented new and useful Improvements in Show-Cases, of which the following is a specification.

This invention relates to improvements in glass show cases, including show windows, of that kind in which the plates or sections of glass are cemented together at their points of union.

The primary object of the invention is to provide a joint or union for connecting the abutting surfaces of the plates together in such manner as to present a neat and ornamental appearance at the point of union, and another object of the invention is to provide a separable or rip joint or union whereby a broken or damaged plate may be readily freed for removal without disturbing the other plates and a new plate applied in its place without the absolute necessity of employing skilled labor.

The invention consists of the features of construction, combination and arrangement of parts, hereinafter fully described and claimed, reference being had to the accompanying drawing, in which:—

Figure 1:
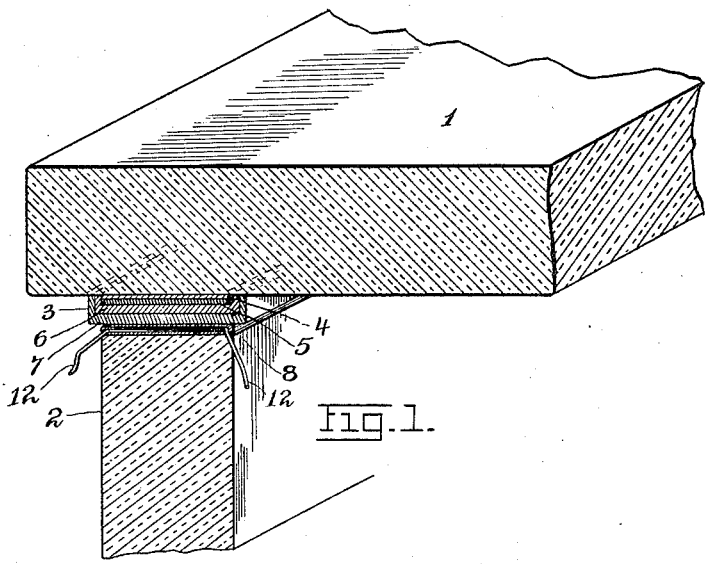
Figure 3:
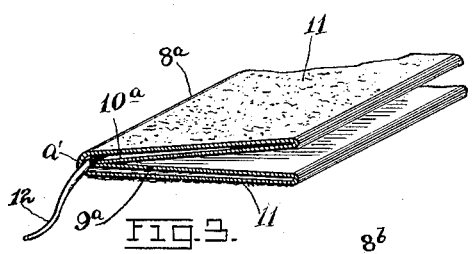
Figure 2:
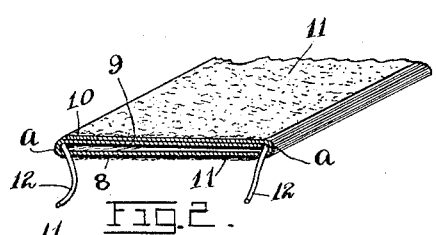
Figure 4:
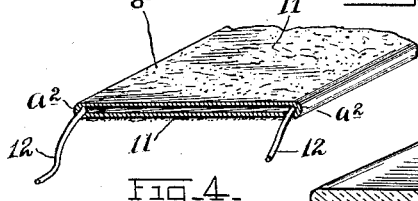
Figure 5:
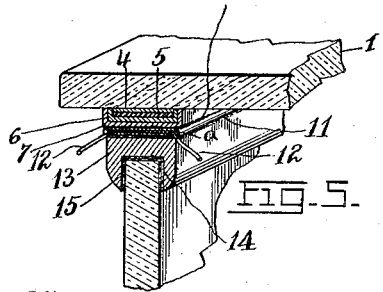
Figure 6:
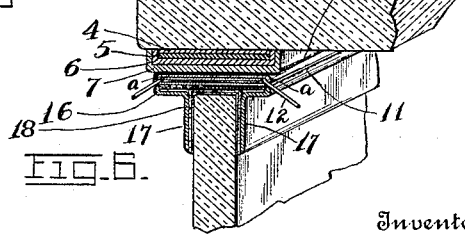

Figure 1 is a sectional view in perspective of two plates of a glass show case united by my improved joint, the parts of the joint being shown on an exaggerated scale for clearer illustration. Fig. 2 is a sectional perspective view of the form of joint strip shown in Fig. 1. Fig. 3 is a sectional perspective view of a modified form of joint strip. Fig. 4 is a similar view of still another modified form of joint strip. Fig. 5 is a view similar to Fig. 1, showing the mode of joining the plates when one of the plates is set in a wooden frame, as in the construction of back-frames of show cases. Fig. 6 is a similar view, showing the mode of joining the plates when one of the plates is provided with a metal cap.

Referring to the drawings, 1 and 2 designate adjoining plates or sections of a glass showcase, which may, for convenience of description, be considered the horizontal top plate and one of the vertical plates of a showcase counter, which plates are united at their abutting surfaces or point of union by my improved joint, generally indicated at 3. In forming the joint 3, I first prepare the abutting surface of one of the plates, as the plate 1, by providing the same with a suitable coating of sizing 4, upon the back of which is deposited a metallic layer 5, preferably silver, such as nitrate of silver and arsenite of tartrate, or other suitable analogous salt, or a strip of gold, silver or other foil or an ornamental strip of other material, thus producing a film of metallic alloy having a brilliant reflecting surface or an ornamental layer of any preferred kind, which will show through the plate 1 and conceal the joint and give a neat and ornamental appearance at the point of union.

The layer or coating of sizing 4 is employed to firmly bind the ornamental reflecting film or surface 5 to the plate 1 so that it will not scale or peel off and will provide a firm surface to which the other elements of the joint will adhere in a secure manner. The film or layer 5 is then backed or coated by a primary protective layer 6 of shellac or other like substance, and upon the shellac is also preferably deposited a second protective coating 7, which may consist of some suitable mineral paint. The abutting surface of the plate 1 so prepared is thus admirably adapted to conceal the joint and present an ornamental appearance at the point of union, and also to receive and firmly adhere to the coupling element of the joint whereby the two plates are cemented together. Preferably the edges of the layers 6 and 7 project beyond the edges of the layers 3, 4 and 5, as shown, to prevent breaking or wearing away of the margins of said layers 3, 4 and 5 when the glass is rubbed, as in dusting or cleaning the same.

Under some conditions, the upper edge or abutting surface of the plate 2 may be secured to the prepared abutting surface of the plate 1 by any of the cements in common use. I prefer, however, to employ a coupling connection which, while serving to firmly unite the plates together, may be broken or ruptured so that the plates may be disconnected for the removal of either when damaged and the substitution of a new plate therefor. To this end I provide a joint which may be readily and conveniently severed or ripped apart, so that the owner of a damaged case may, without the employment of skilled labor, detach the damaged plate and apply a new one in its place. By this means the necessity of taking the case entirely apart or shipping it to a factory for repairs will be avoided, and the case remain in use until a plate of the size required is received from the source of supply, when repairs may be easily made.

In Figs. 1 and 2, I have shown one form of joint strip which may be employed. This strip comprises a flattened tube 8 of paper, fabric, metal foil or other suitable flexible cushioning material capable of being longitudinally ripped or severed for the detachment of one plate section from another. The strip is coextensive in length and width with the abutting surfaces and is formed by folding a longitudinal strip of the material into the form shown, with the edges of the material overlapped in the form of flaps 9 and 10 at one side of the strip. This construction provides a flat tube having separable leaves, plies or tiers formed respectively by the flaps and the bottom of the strip, which leaves, plies or tiers are united by the integral marginal folds $a$. The outer faces of the strip are provided with a coating 11 of some suitable strong adhesive or cement, which is normally dry and adapted upon being moistened to adhere strongly to the surfaces to be joined. Through this tubular strip, at or adjacent to each of its longitudinal folds or edges $a$, extends a ripping or severing element 12, in the form of a cord or wire, the ends of which may be allowed to project slightly adjacent the corners of the showcase or reached by simply cutting away a part of the strip, so that they may be grasped and employed to sever the joint strip along its length in an obvious manner.

The surface or edge of the plate 2 which is to be joined to the abutting surface of the plate 1 is ground or otherwise roughened so that the joint strip will firmly adhere thereto. In connecting the plates so prepared together, the gummed faces of the joint strip are moistened and disposed between the abutting surfaces, which are then brought closely together, whereupon such gummed faces of the strip will securely unite the plates, and at the same time form a cushion which will allow a desired slight relative yielding motion of the plates without injuring the joint. In the event of injury to either of the plates, the joints connecting the damaged plate with the other plates of the showcase may be ripped along one of their longitudinal edges, so that the damaged plate may be conveniently detached. To apply a new plate it is then simply necessary to bring the same into proper relation to the other plates and insert previously moistened joint strips between the abutting faces, whereupon the new plate will be firmly secured in place. This operation may be performed by any one possessing a slight degree of mechanical skill, thus obviating the necessity of employing skilled labor.

The joint strips may be varied materially in construction from the form shown in Fig. 2. In Fig. 3, I have shown a form of joint strip $8^a$ in which the flaps $9^a$ and $10^a$ extend inwardly from one of the side edges of the strip between the opposing faces thereof, producing an integral fold or connecting portion $a'$ at the opposite longitudinal side edge of the strip within which a single severing cord or wire is arranged. In Fig. 4, I have shown another form of joint strip $8^b$, consisting of a closed tube formed of pliable sheet metal, woven from a suitable fabric or otherwise constructed, the leaves or plies of said tube having integral folds or connecting portions $a^2$ inclosing severing cords or wires in the same manner as is shown in Fig. 2. In all of these constructions the plies or leaves of the joint strip are free from connection with each other except at the point or points to be severed, and, hence, are adapted to have relative motion to permit the glass sections to have the necessary degree of compensating motion and to be cushioned to prevent their injury under vibrations, shocks or blows. Under the construction shown in Fig. 3, it is necessary to strip the leaves apart only at one longitudinal side edge in order to free the glass sections, while with the other constructions the leaves must be severed along their opposite longitudinal side edges, which, however, may be readily and conveniently accomplished by drawing upon both severing cords or wires at one time. It will be observed that this construction of the joint strip facilitates the connection as well as the disconnection of the glass sections over a construction employing two normally independent strips cemented together with an interposed severing device, since it is not necessary for the severing device to cut through cemented portions, and all liability of the severing device being itself cemented between the plies is obviated. Furthermore, the leaves or plies, being free from connection with each other or sufficiently free for body movement, afford a greater amount of elasticity than the inherent elasticity of the material of which they are made, and thus give a greater amount of cushioning effect.

In show cases where the rear glass panes are set within a wooden door frame, the joint strips will be cemented to the adjacent rail or strip 13 of the frame, which is provided with a groove 14 for the reception of the edge of the glass section set therein. This edge of the glass section may be secured in position by a strip of paper 15 inclosing the edge and adjacent portions of the sides thereof and cemented to the walls of the groove and surfaces of the glass, as illustrated in Fig. 5.

In Fig. 6, I have shown the joint strip cemented to the cross piece of a metallic cap 16 which is provided with parallel flanges 17 to receive the edge of one of the glass sections, which may be secured therein by a binder strip 18 cemented to the glass and flanges substantially in accordance with the construction shown in Fig. 5. I thus reserve the right to employ the strip for either directly connecting the abutting edges of glass sections or for directly uniting one glass section to the frame of or a member applied to the adjoining glass section, either of which modes of application shall be considered as falling within the spirit and scope of the appended claims.

Having thus described my invention, I claim:—

1. A show case embodying adjoining plates of glass, a transparent coating of sizing applied directly to the surface of one of the plates, a deposited metallic layer on said sizing and showing therethrough, a protective coating of shellac covering said metallic layer, a second protective coating of mineral paint over said shellac coating, and a cementitious binder between said second protective layer and the other plate.

2. A show case embodying adjoining plates of glass, a transparent coating of sizing applied directly to the surface of one of the plates, a deposited metallic layer on said sizing and showing therethrough, a protective covering over said metallic layer, a cementitious binder between said protective layer and the other plate, said binder comprising separable leaves having a connecting fold, and means disposed between said leaves for cutting through said fold.

In testimony whereof I affix my signature in presence of two witnesses.

FRANCIS X. GANTER.

Witnesses:
W. O. PEIRSON,
J. M. MILLER.

Copies of this patent may be obtained for five cents each, by addressing the "Commissioner of Patents, Washington, D. C."